July 29, 1930.  L. LLEWELLYN ET AL  1,771,411
CONVEYING LINK CONSTRUCTION
Filed April 20, 1928   3 Sheets-Sheet 1
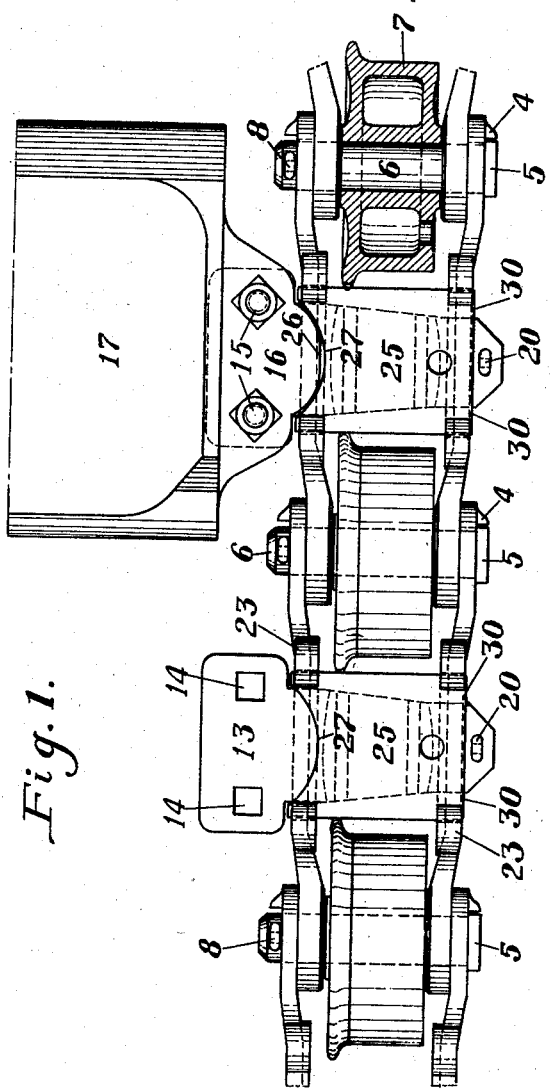
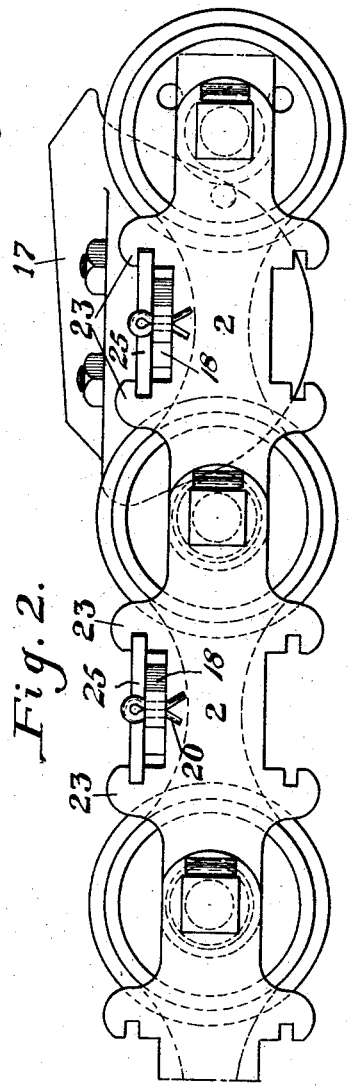
INVENTORS
Lee Llewellyn
Carl L. Kenney
by C. M. Clarke July 29, 1930.  L. LLEWELLYN ET AL  1,771,411
CONVEYING LINK CONSTRUCTION
Filed April 20, 1928   3 Sheets-Sheet 2
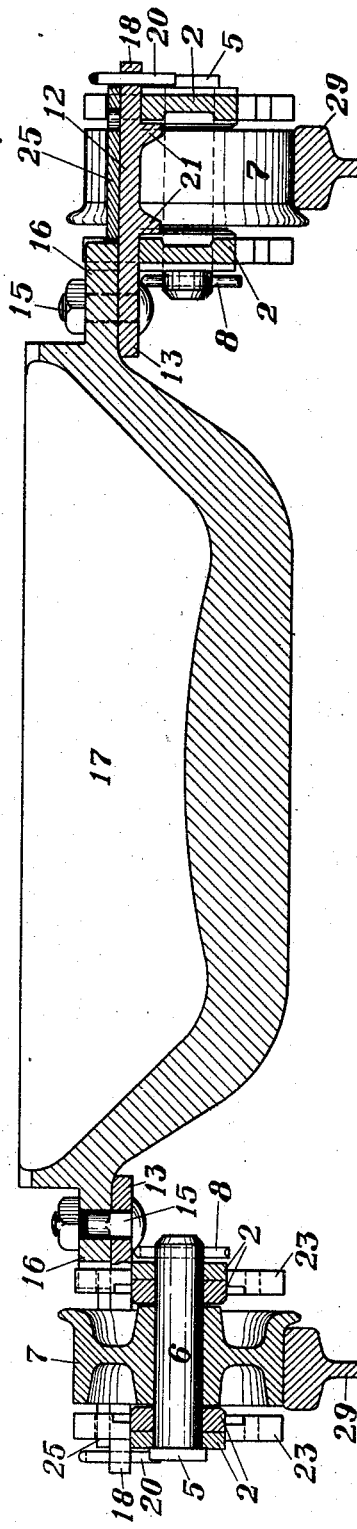
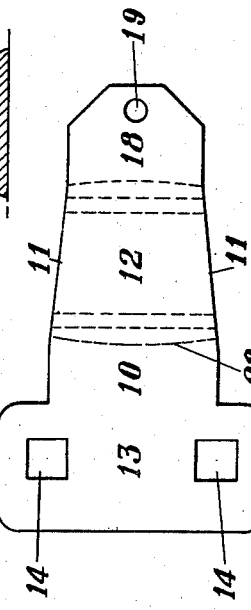
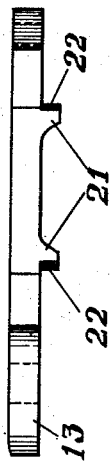
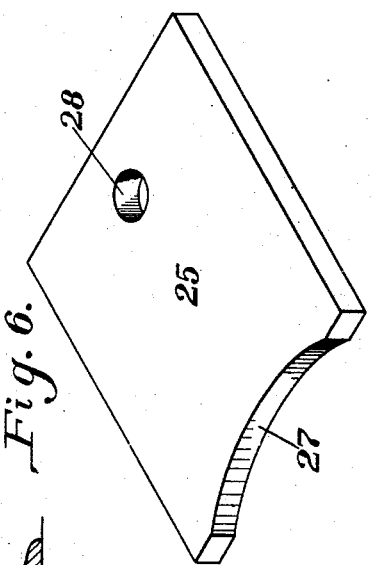
INVENTORS July 29, 1930.  L. LLEWELLYN ET AL  1,771,411
CONVEYING LINK CONSTRUCTION
Filed April 20, 1928   3 Sheets-Sheet 3
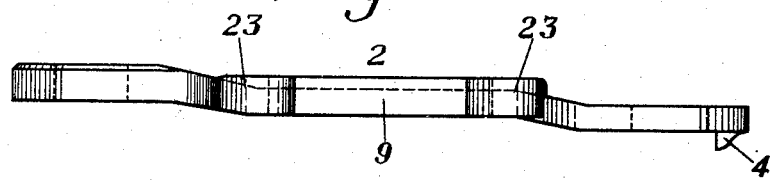
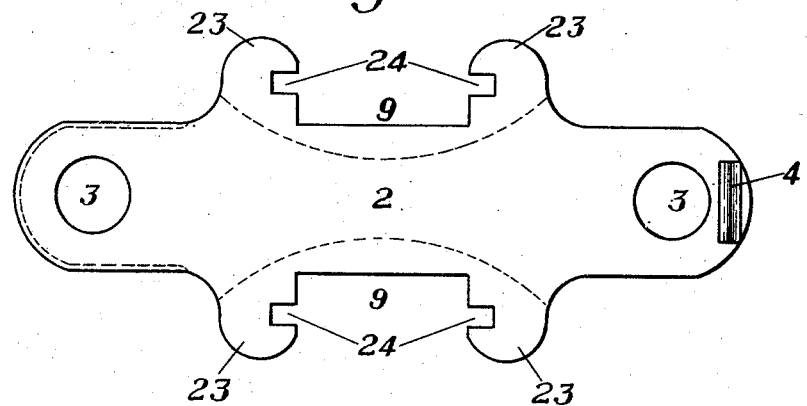
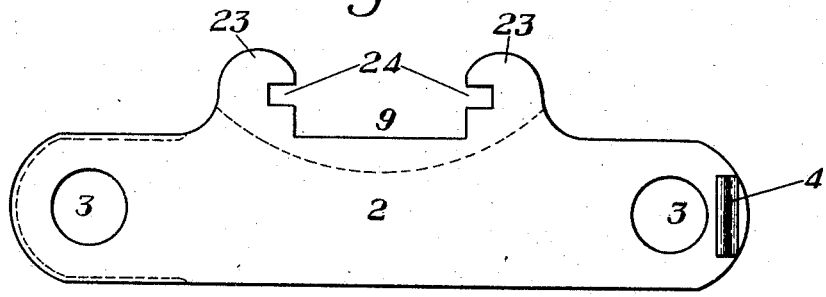
INVENTORS Patented July 29, 1930

1,771,411

UNITED STATES PATENT OFFICE

LEE LLEWELLYN, AND CARL L. KENNEY, OF DORMONT, PENNSYLVANIA

CONVEYING LINK CONSTRUCTION

Application filed April 20, 1928. Serial No. 271,640.

Our invention relates to improvements in link construction for conveyors, and is particularly adapted to provide an improved link mechanism for supporting the ends of the molds of pig casting machines. In such mechanism, the molds, of desired form and capacity, are generally mounted by their end portions upon the supporting carrying chains, one main chain composed of its connected supporting links being arranged at each side of the series of continuous molds.

The present invention has for its object to provide a chain construction composed of twin links mounted by their connecting ends upon supporting rollers or wheels, with connecting pivoting axle pins or bolts, each pair of links having loosely mounted supplemental bridge pieces connected directly with the ends of the mold for support thereof.

The invention is generally somewhat similar to that of prior patent of Hurst #1,154,401. In such construction the bridge pieces were mounted in transverse longitudinal closed slots at the middle portion of the links, with a degree of clearance permitting for a limited range of movement under the strains of service.

In the event of breakage or wear requiring substitution of any of the parts, it was necessary, however, to disassemble the link mechanism from the supporting rollers, for substitution of a link or of a bridge piece, involving delay and wasteful stoppage of the machine.

The present invention has for its object to improve and simplify the construction, enabling repair or substitution of parts to be easily and quickly made, while at the same time enlarging the capacity of the mechanism for compensation of wear, expansion or contraction, etc., with greater flexibility of the chain and bridge mechanism, without reducing its continued efficiency.

These objects are accomplished by providing the links with open slots or receiving seats for the mold supports, means compensating for movement of one side chain in advance of the other tending to diagonal strains and distortion, and means securing the parts in position adapted for easy application and removal, together with other features of construction and advantage, as shall be more fully hereinafter described.

Referring to the drawings showing one preferred embodiment of the invention:

Fig. 1 is a plan view showing a series of connected links and their associated parts;

Fig. 2 is a view of the construction in side elevation;

Fig. 3 is a transverse sectional view through one of the molds and its chain supporting mechanism, one of the wheels being shown in section;

Fig. 4 is a detail plan view of the bridge piece;

Fig. 5 is an edge view of the bridge piece in elevation;

Fig. 6 is a perspective detail view of the keeper plate;

Fig. 7 is a plan view of one of the links;

Fig. 8 is a view of the link in side elevation;

Fig. 9 is a similar view, showing a modified construction.

The links 2 are arranged in pairs side-by-side, one end overlapping the connecting end portion of the next connected link, the other end overlapping the adjacent link, the ends of the links being deflected outwardly and inwardly respectively, whereby to maintain the middle body portions of all of the links in alinement. The outer terminal portion of each link 2 is provided with the usual axle bolt holes 3 and at one end with a vertically arranged abutment or lug 4 adapted to retain the squared head 5 of the connecting bolt or pin 6, upon which the supporting wheel 7 for track rail 29 is rotatably mounted, between the connected ends of adjacent links. The other end of the bolt is retained in place by a cotter pin 8 or other suitable retaining device, the lug 4 tending to hold the bolt non-rotatably in position.

Each link is provided at its middle portion between the ends, with a longitudinal open slot 9 adapted to receive the outer end of the bridge piece or mold support 12. The mold support or bridge piece in such construction is substantially flat and continuously straight, having the inner widened attaching base 13 with a pair of bolt holes 14 for connection by squared shank bolts 15 with the terminal lugs 16 of mold 17.

Mold support 12 is of maximum width at its inner neck portion 10, adapting it to fit loosely within the squared inner recess of the open slot 9 of inner link 2, with sufficient clearance for loose engagement therein. The side edges of the support 12 are tapered toward the outer end, as at 11, the support having the narrowed parallel-sided end 18 for loose engagement within the open slot 9 of the opposite link. We thus provide for considerable lateral clearance 30 therein, for movement forwardly or backwardly, permitting a variable range of diagonal adjustment of the mold in either direction.

The terminal of the member 12 is provided with a cotter pin hole 19 whereby a cotter pin 20 inserted in said opening will retain the parts together.

The under side of the mold support 12 is provided with downwardly extending lugs 21 adapted to project below the supporting edge of the open slot and to bear with sufficient clearance against the inner side of the opposite links of each pair.

The outer face 22 of each lug 21 is rounded as indicated, facilitating an equal bearing engagement at varying laterally assumed positions of the mold supports.

The open slot 9, which may be at one or both sides of the longitudinal center of the link 2, is located outwardly beyond its longitudinal midde portion sufficiently far to carry the mold support and the mold clear of any interference, and at the proper receiving and discharging distance beyond the supporting running gear. The inner portion of the open slot 9 is rectangular as shown, of dimensions adapted to loosely receive the extended tongue member of the mold support 12 as above described, and of the proper depth therefor. At each side of the open slot 9 are provided extended lugs 23 providing sufficient stock for the inner transverse notches or slots 24 just beyond the normal depth of the open receiving slot area 9, for insertion therein of the keeper plate 25.

Said plate, as shown, lies over the top of the support 12, slidably mounted within slots 24, extending across above the mold support from one link to the other, and completely covering it by its greater width, as clearly shown in Fig. 1. Plate 25 is retained against outward movement by the cotter pin 20 and bears by its inner end against the terminal lug 16 of the mold. The outer edge portion of such terminal lug is rounded as indicated at 26, and bears directly against the inner concavely rounded edge portion 27 of plate 25.

By such construction, the plate being normally held immovably, the mold may change its position to either side of a right angle arrangement with relation to the pulling line of the chains, within the range of movement provided by the outer narrowed portion 18 of the mold support, by such rounded engagement against the retaining plate. The outer portion of plate 25 is provided with a hole 28 for insertion of any adjusting implement or for supply of lubricant between it and the mold support 12.

The links 2 are preferably made with the open slot 9 at opposite sides of its middle portion as shown, providing for reversal of the link in case of wear or breakage at one side and continued use, while also facilitating the erection of the chain in installing. The construction provides not only for a considerable desirable degree of flexibility of movement frequently necessary in case of excessive expansion or contraction in long strands of chains or excessive wear at either side thereof. The retaining plate construction also provides for the reversal of position of the molds in passing around the terminal sprocket-wheels for return movement without disarrangement or loss of any parts.

The open slot construction of the link permits of easy removal and renewal of the mold support or of an entire mold and its attached supports, by merely removing the cotter pins 20 and the keeper plates 25, leaving the main link members intact.

Such facility of change is a feature of very considerable advantage and economy of time in operation, it being frequently possible to make such a change without stopping the travel of the series of molds.

The open slot 9 may be provided with other means for holding the mold support in position of different detail construction than that described, but the arrangement herein shown has given excellent results in practice, with the advantages noted.

The weight of the continuous series of molds and their contents when thus mounted on the chains is thus equally distributed at each side, and transferred to the several link members, overcoming any tipping tendency or inequality of the load or pressure, and avoiding to a large degree any resulting unequal wear.

If desired, the links 2 may be provided with the bridge receiving slot at one side only, as in Fig. 9, thereby slightly reducing their weight and cost.

The construction and operation of the invention will be readily understood and appreciated by all those familiar with this class of machinery. It is extremely simple, highly efficient, continuously serviceable, and capable of renewal or repair, as described.

The construction of the mechanism may be variously changed or modified in different features or details by the skilled mechanic, but all such changes are to be understood as within the scope of the following claims.

What we claim is:—

1. The combination with a pair of open top slotted links, of a transverse supporting bridge member laid in the open top slots thereof and provided with a mold attaching terminal and a superimposed retaining plate.

2. The combination with a pair of open top closed bottom slotted links, of a transverse supporting bridge member having an outer narrowed portion for lateral clearance and an inner mold attaching terminal, said bridge member being laid in the open tops and upon the closed bottoms of the slots of the links, and a superimposed retaining plate for the bridge member engaging the links.

3. The combination with a pair of open top closed bottom slotted links, of a transverse supporting bridge member having an outer narrowed portion for lateral clearance and an inner mold attaching terminal, said bridge member being laid in the open tops and upon the closed bottoms of the slots of the links, and a retaining plate engaging the links for preventing removal of the bridge member.

4. The combination with a pair of oppositely arranged links of a conveyor chain each having a rectangular opening at its upper edge portion and plate retaining lugs, of a transverse supporting bridge member laid across the links in said openings, and a retaining plate thereon engaging said lugs.

5. The combination with a pair of oppositely arranged links of a conveyor chain each having a rectangular opening at its upper edge portion, of a transverse supporting bridge member laid across the links in said openings having an inner mold attaching portion, an adjacent shank portion engaging the rectangular opening of one link with slight clearance and an outer narrowed terminal portion engaging the rectangular opening of the other link with increased clearance for lateral shifting movement.

6. The combination with a pair of oppositely arranged links of a conveyor chain each having a rectangular opening at its upper portion and plate retaining lugs, of a transverse supporting bridge member laid across the links in said openings having an inner mold attaching portion, an adjacent shank portion engaging the rectangular opening of one link with slight clearance and an outer narrowed terminal portion engaging the rectangular opening of the other link with increased clearance for lateral shifting movement, a mold having its end supported on and secured to the attaching portion of the bridge member, and a retaining plate for the bridge member engaging said lugs and the end of the mold.

7. The combination with a pair of oppositely arranged links of a conveyor chain each having a rectangular opening at its upper edge portion and plate retaining lugs, of a transverse supporting bridge member laid across the links in said openings having an inner mold attaching portion, an adjacent shank portion engaging the rectangular opening of one link with slight clearance and an outer narrowed terminal portion engaging the rectangular opening of the other link with increased clearance for lateral shifting movement, a mold having a rounded end supported on and secured to the attaching portion of the bridge member, and a retaining plate for the bridge member engaging said lugs and provided with a rounded edge engaging the rounded edge of the mold.

8. The combination with a pair of oppositely arranged links of a conveyor chain each having a rectangular opening at its upper edge portion and plate retaining lugs, of a transverse supporting bridge member laid across the links in said openings having an inner mold attaching portion, an adjacent shank portion engaging the rectangular opening of one link with slight clearance and an outer narrowed terminal portion engaging the rectangular opening of the other link with increased clearance for lateral shifting movement, a mold having a rounded end supported on and secured to the attaching portion of the bridge member, a retaining plate for the bridge member engaging said lugs and provided with a rounded edge engaging the rounded edge of the mold, and means preventing endwise movement of the bridge member.

9. A link for conveying chains of the class described provided with an open top closed bottom bridge receiving slot and supplemental endmost plate retaining slots.

10. A link for conveying chains of the class described having at its middle edge portion an open top closed bottom shouldered recess and supplemental oppositely located retaining slots beyond the bridge slot.

11. A link for conveying chains of the class described having at its middle edge portion an open top shouldered recess and plate retaining lugs extending beyond said recess at each side thereof.

12. A link for conveying chains of the class described having at its middle edge portion an open top longitudinal shouldered bridge-receiving recess and retaining lugs having plate receiving recesses located upwardly and laterally beyond said bridge receiving recess.

13. A link for conveying chains of the class described having at its opposite middle edge portions a pair of similarly shaped open top closed bottom shouldered recesses and endmost plate retaining slots.

14. A flat supporting bridge member for seating and supporting mounting across the open slot cavities of a pair of links having an inner mold attaching portion, a shank portion for engagement with one of said links, and a narrower terminal portion for engagement with the other link.

15. A flat supporting bridge member for seating and supporting mounting across the open slot cavities of a pair of links having an inner mold attaching portion, a shank portion for engagement with one of said links, a narrower terminal portion for engagement with the other link and having a cotter pin hole, and limiting abutments on its under side for engaging the inner faces of the links.

16. A keeper plate for a mold support having lateral parallel holding edges and an inner concaved mold engaging edge.

17. A keeper plate for a mold support having lateral parallel holding edges, an inner concaved mold engaging edge, and a transverse hole.

In testimony whereof we hereunto affix our signatures.

LEE LLEWELLYN.
CARL L. KENNEY.